April 3, 1951     W. W. LOWTHER     2,547,587
CRANKCASE VENTILATING SYSTEM FOR A
PLURALITY OF ASSOCIATED ENGINES
Filed Sept. 17, 1949
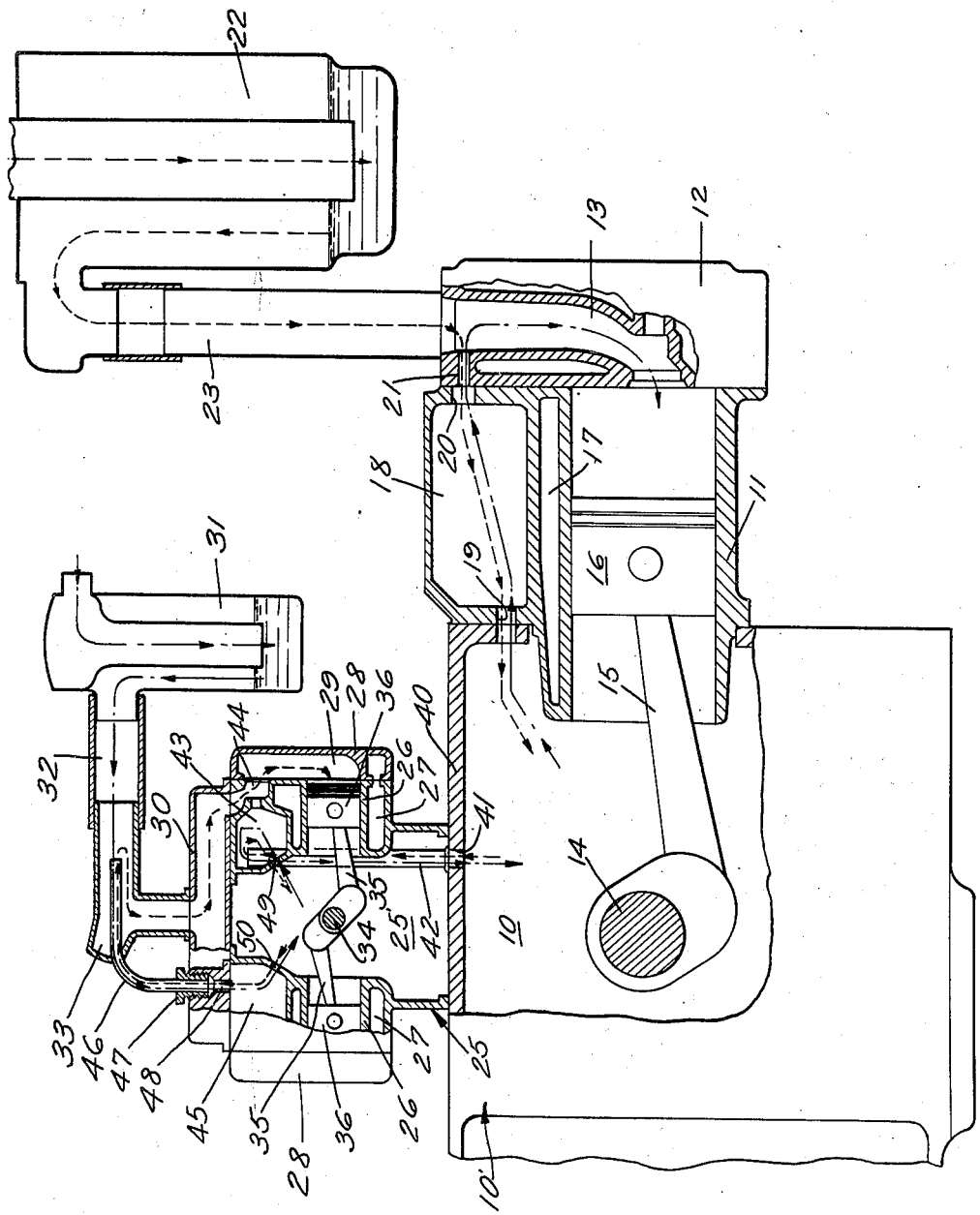
Inventor
Wilfred W. Lowther
By his Attorneys
Merchant & Merchant Patented Apr. 3, 1951

2,547,587

UNITED STATES PATENT OFFICE 2,547,587

CRANKCASE VENTILATING SYSTEM FOR A PLURALITY OF ASSOCIATED ENGINES

Wilfred W. Lowther, Minneapolis, Minn., assignor to Donaldson Company, Inc., St. Paul, Minn., a corporation of Minnesota Application September 17, 1949, Serial No. 116,273

8 Claims. (Cl. 60—97)

This invention relates to internal combustion engine crankcase ventilation and, more particularly, to the ventilation of crankcases of a plurality of internal combustion engines in situations in which such engines are used in a single installation, for example.

A typical example of the use of a pair of internal combustion engines is in Diesel-powered equipment, such as tractors. In such case, the equipment is powered by a Diesel engine of substantial capacity and a smaller gasoline engine is associated with the Diesel engine for starting the latter. In the case of a tractor equipped with a Diesel engine, it is common to locate the gasoline or starting engine alongside or on top of the main or Diesel engine. Such conventional tractors afford an ideal arrangement for the use of the present invention.

The purposes of ventilating the crankcase of an internal combustion engine are, of course, well known and in the usual arrangement, reliance is placed on low pressure areas in the intake manifold for the drawing off of vapors from the crankcase. In the ventilation of crankcases of internal combustion engines for passenger automobiles that operate at higher speeds, a ventilating tube open to the atmosphere may be used and reliance is placed on the speed of operation of the vehicle to draw off the crankcase vapors. In either case, it is desirable that fresh air taken into the crankcase be drawn or forced through a filter or air cleaner. It is known, of course, to supply cleaned or filtered air to the crankcase of a single internal combustion engine. In most cases of this type, a separate filtering or cleaning element is provided.

According to the present invention, the basic concept involves the use of the standard or regular air cleaner on one engine for cleaning or filtering the air that is drawn into the crankcase of the other engine, the arrangement is such that the air cleaner for each engine thus serves the double function of filtering both the intake air for that particular engine and also filtering or cleaning air for the crankcase of the other engine. A further object of the invention is to interconnect the crankcases of the two engines in air-flow communication so that when the starting engine, for example, is running it will draw air through its own air cleaner for combustion and will draw cleaned air from the main engine air cleaner through the crankcases of both engines to ventilate the crankcases. Additionally, the cleaned air drawn through the crankcases along with crankcase vapors is delivered to the air-intake system of the operating engine so that the mixture of air and vapor is consumed in the combustion chamber. Alternatively, when the Diesel engine, once having been started by the starting engine, runs while the starting engine is idle, the reverse of the foregoing operation is followed; that is, the Diesel engine utilizes its own air cleaner for the supply of combustion air and utilizes the starting engine air cleaner for the supply of fresh air to be drawn through both crankcases and ultimately delivered to the combustion chamber or chambers of the Diesel engine. Other objects of the invention are: To provide for the ventilating of chambers associated with the crankcases; to provide metering means for regulating the air flow; to provide in an arrangement in which the starting engine is mounted on top of the Diesel engine an air-flow tube communicating the engine crankcases and disposed with its upper end above the oil level in the starting engine.

The foregoing and other desirable objects and important features inherent in and encompassed by the invention will become apparent as the disclosure of a preferred form of the invention is more fully made in the following detailed description and accompanying sheet of drawing, in which the single figure represents in schematic fashion an arrangement in which a pair of engines are associated in an arrangement in which one is a gasoline engine used for starting the other, which is a Diesel engine.

Inasmuch as the drawing is largely schematic, it will be understood that the relationship between the two engines and the general proportioning of the parts are only representative; hence, the specific illustration should not be taken as limiting the broad concept of the invention.

The Diesel or main engine is indicated as having a crank chamber 10 defined by a crankcase 10' from which a cylinder 11 extends forwardly, the engine illustrated being of the type shown in the U. S. patent to McCray No. 1,919,069. The cylinder 11 is provided with a cylinder head 12 which includes an intake passage or conduit 13 communicating in the usual manner with the combustion chamber within the cylinder 11. The numeral 14 indicates a crankshaft and the numerals 15 and 16 respectively indicate a connecting rod and piston, all of which is conventional construction. The numeral 17 indicates that the cylinder 11 is jacketed for cooling purposes. A secondary chamber 18 is associated with the cylinder 11 and ordinarily contains such engine auxiliaries and controls therefor, such as fuel injection pumps (not shown), the details of which are not important here.

The proximate or adjoining walls of the crankcase 10 and chamber 18 are provided with cooperating apertures which form an air-flow passage 19. The adjoining walls between the chamber 18 and cylinder head 12 are provided with cooperating apertures which establish an air-flow passage 20 the apertures in the cylinder head 12 being reduced in size as at 21 to provide a metering orifice for controlling air flow. The passages 19, 20, and 21 provide communication between the interior of the crankcase 10 and the intake passage 13.

The air-intake system of the Diesel engine includes the intake passage 13 and an air cleaner 22 which may be of any conventional construction and which is connected to the intake passage 13 by an air-flow conduit 23 which, likewise, may be of any conventional construction. The air cleaner illustrated is preferably of the oil-bath type.

The internal combustion engine used for starting is of the gasoline-mixture type and comprises basically structure defining a crankcase 25, providing a crank chamber 25', and a pair of opposed cylinders 26, each of which, cylinders, is jacketed at 27 for cooling purposes. Each cylinder 26 includes a cylinder head 28 having an intake passage 29 connected in conventional manner to an intake manifold 30 which forms part of an air-intake system including preferably an oil-bath cleaner 31, an air-intake conduit 32, and a carburetor represented schematically at 33. The numeral 34 represents a crankshaft which may be connected by conventional connecting rods 35 respectively to pistons 36 in the cylinders 26.

In the particular arrangement illustrated, the starting engine is mounted on top of the Diesel engine and for this purpose the crankcase 10' is provided with an upper wall 40 which is apertured at 41 directly in alinement with the open bottom of the crankcase 25 of the gasoline engine. A reversible air-flow tube 42 has its lower end fitted in the aperture 41 and the tube extends upwardly in the crankcase 25 of the gasoline engine so that its upper end is disposed substantially above the oil level in the crankcase 25. Specifically, the upper end of the air-flow tube is in communication with an auxiliary chamber 43 adjacent the right hand cylinder 26 and adjacent a passage 44 which intercommunicates the intake manifold 30 and the right hand intake passage 29 in the right hand cylinder head 28. A chamber 45 similar to the chamber 43 is provided for the left hand side of the gasoline engine, except that there is no second tube like the tube 42. Similarly, the intake passage (not shown) in the left hand cylinder head 28 is connected to the intake manifold 30 by a passage (not shown) similar to the passage 44. Normally, opening and closing of the passages 44 are controlled by conventional valves, but these have been omitted in the interests of clarity.

The left hand chamber 45 is in communication with the air-intake system of the gasoline engine. This communication is provided by a tube 46 which enters the air-intake portion of the carburetor 33 and is bent downwardly and provided with a fitting 47 to communicate with a short vertical passage 48 provided in the manifold 30 in airflow communication with the chamber 45, the passage 48 being separate from the passage within the intake manifold 30.

The operation of the system will be best understood by recalling that the basic idea is the use of the air cleaner of one engine to facilitate ventilation of the crankcase of the other engine, primarily in instances in which one engine is operating while the other is idle. For example, when it is desired to start the Diesel engine, the gasoline engine is first started and by means of conventional controls including a clutch (not shown) the gasoline engine is connected to the Diesel engine for turning over the latter. When the Diesel engine is conditioned for operating under its own power, the control system is actuated to disconnect and stop the gasoline engine, whereupon the Diesel engine runs and the gasoline engine is idle.

For the purpose of clarifying the paths of air flow when one or the other of the engines is operating, arrows of different types have been used, the dotted lines and arrows indicating the air flow when the gasoline engine is running and the Diesel engine is idle, and dot-dash lines and arrows being used to indicate the path of air when the Diesel engine is running and the gasoline engine is idle. For the purposes of simplicity, the paths of intake air for combustion have been omitted.

Assuming that the gasoline engine is started preparatory to starting the Diesel engine, a pressure differential will occur between the air intake system of the gasoline engine and the air inlet for the air cleaner 22 of the Diesel engine. That is to say, the pressure on the air inlet of the air cleaner 22 will be atmospheric and the pressure in the intake system of the gasoline engine will, of course, be sub-atmospheric. Therefore, the air will flow through the air cleaner 22, through the intake conduit 23, through the metering orifice 21, aperture 20, chamber 18, passage 19 and into the crankcase 10, whence it will follow upwardly through the air-flow tube 42 to the chamber 43 and then into the gasoline engine crankcase 25 via an aperture 49 communicating the crankcase 25 and chamber 43. From the crankcase 25, the air, together with entrained vapors, will move through a communicating opening 50 between the crankcase 25 and chamber 45 into the chamber 45 and then through the passage 48, tube 46, carburetor 33, intake manifold 30, intake passages 29 in the cylinder heads 28 and thence into the combustion chambers of the cylinders 26. The establishment of the air flow through the chambers 18, 43 and 45 eliminates the possibility that vapors will collect in the chambers. The tube 42 provides a connection between the crankcases 25 and 10 without resort to external connections, being primarily adapted to an arrangement in which the starting engine is mounted in close association with the Diesel engine as illustrated.

As stated above, after the gasoline engine has been run sufficiently to condition the Diesel engine for starting and running on its own fuel, the gasoline engine is disconnected from the Diesel engine. Thereupon, the air flow is reversed and the pressure differential between the intake passage 13 in the Diesel engine and the air inlet for the gasoline engine air cleaner 31 causes air to flow as indicated by the dot-dash lines and arrows; that is, through the air cleaner 31, conduit 32, carburetor 33, tube 46 and passage 48, chamber 45, crankcase 25, chamber 43, and tube 42 to the Diesel engine crankcase 10, whence it flows through the chamber 18 via the passages 19, 20 and 21 into the intake passage 13 of the Diesel engine to be consumed in the Diesel engine combustion chamber.

The location of the restricting orifice at 21 rather than at 19 is of some importance in reducing vacuum in the compartment or chamber 18, which may be critical in some installations depending upon the number of openings in the chamber 18 that communicate with the atmosphere and the adequacy of the sealing means provided for these openings.

The operation of the system as illustrated depends upon the pressure differential between the air-intake system of one engine and the air-intake system of the other, which pressure differential in the present case relies upon the pressure drop between atmospheric pressure and lower pressures created in the air-intake system of the particular engine that is running. However, the invention contemplates the use of a system in which pressure at the air cleaner of the idle engine may be higher than atmospheric, as in instances in which air is supplied under the action of a pump, as in the U. S. patent to McCormick, 2,410,514. Similarly, the invention contemplates any system in which air is caused to flow in one direction or the other for the ventilation of the crankcase of an internal combustion engine via the air cleaner or air-intake system of one or more other internal combustion engines. Numerous other possibilities applying the basic idea involved in the present invention will undoubtedly occur to those skilled in the art, it being understood that the present illustration is schematic and is susceptible to various modifications and alterations that do not depart from the spirit and scope of the invention as defined in the appended claims.

What I claim is:

1. In combination: a pair of internal combustion engines arranged for operation of either independently of operation of the other, each having its own crankcase and its own air-intake system, each air-intake system including an air cleaner; means providing an air-flow passage inter-communicating the crankcases; means including an air flow duct interconnecting each crankcase and its own air-intake system at a cleaned-air point in the latter; each air-intake system being in air-flow series with the other via one of the duct means, one crankcase, the passage means, the other crankcase and the other duct means, so that during a condition in which one engine is operating and the other is not, the air-intake system of the operating engine will be subjected to sub-atmospheric pressures and the air-intake system of the non-operating engine will be open to at least atmospheric pressure and cleaned air will be caused to flow from the air-intake system of the non-operating engine, through the duct means of said non-operating engine and into the crankcase of said non-operating engine and thence through said passage means into the crankcase of the operating engine and through the duct means of said operating engine to the air-intake system of said operating engine.

2. In combination: a first internal combustion engine having a crankcase and air-intake system including an air cleaner; a second internal combustion engine having an air intake system equipped with an air cleaner and having a crankcase including a portion arranged at a level above the first engine crankcase and adapted to contain lubricant; conduit means connecting the first engine crankcase in air-flow relationship to the first engine air-intake system at a point in the latter at which air pressure during operation of the first engine is lower than that in the first engine crankcase; and means for admitting air from a cleaned air point in the second engine air-intake system to the first engine crankcase to be drawn into the first engine air-intake system, comprising conduit means connecting the second engine crankcase portion in air-flow relationship to the second engine air-intake system at a cleaned air point therein above the lubricant level in said second engine crankcase portion, and air-flow duct means intercommunicating said crankcases including a tube disposed in the second engine crankcase portion and projecting above the lubricant level therein.

3. In combination: a first internal combustion engine having a crankcase, an engine cylinder, means providing a chamber adjacent the cylinder, an air intake manifold over the cylinder and chamber, an air-intake conduit connected to the manifold, an air cleaner connected to the intake conduit, air-flow duct means intercommunicating the chamber and the intake manifold, and air-flow duct means intercommunicating the crankcase and chamber whereby sub-atmospheric pressures created in the manifold during operating of the engine effects air flow from the crankcase to the manifold through said chamber and ducts; a second internal combustion engine disposed at a level above the first and having a crankcase at a level above the first engine crankcase and an air-intake system including an air cleaner; and means for supplying cleaned air to the first engine crankcase from the second engine air cleaner, including conduit means intercommunicating a cleaned air point in said second engine intake system and said second engine crankcase, and an air flow tube interconnecting the first and second engine crank cases.

4. In combination: a first internal combustion engine having a crankcase, an engine cylinder, means providing a chamber adjacent the cylinder, an air-intake manifold over the cylinder and chamber, an air-intake conduit connected to the manifold, an air cleaner connected to the intake conduit, air-flow duct means intercommunicating the chamber and the intake manifold, and air-flow duct means intercommunicating the crankcase and chamber whereby sub-atmospheric pressures created in the manifold during operating of the engine effects air flow from the crankcase to the manifold through said chamber and ducts; a second internal combustion engine adjacent the first and having a crankcase and an air-intake system including an air cleaner; and means for supplying cleaned air to the first engine crankcase from the second engine air cleaner, including conduit means intercommunicating a cleaned-air point in said second engine air-intake system and said second engine crankcase, and conduit means intercommunicating the first and second engine crankcases.

5. In combination: first and second internal combustion engines arranged for operation of either independently of the other, each having a crankcase and an air-intake system including an air cleaner; means including a duct intercommunicating the crankcases in air-flow relationship; first conduit means connecting the first engine crankcase in air-flow relationship to a cleaned-air point in the first engine air-intake system; second conduit means connecting the second engine crankcase in air-flow relationship to a cleaned air point in the second engine air-intake system; means operated by the first engine, when the second engine is not operating, for supplying cleaned air from the second engine air-intake system through the second conduit means to the second engine crankcase and thence via the aforesaid duct to the first engine crankcase; and means operated by the second engine, when the first engine is not operating, for supplying cleaned air from the first engine air-intake system through the first conduit means to the first engine crankcase and thence via the aforesaid duct means to the second engine crankcase.

6. In combination: first and second internal combustion engines arranged for operation of either independently of the other, each having a crankcase and an air-intake system including an air-cleaner; means including a duct intercommunicating the chankcases in air-flow relationship; first conduit means connecting the first engine crankcase in air-flow relationship to a cleaned-air point in the first engine air-intake system; second conduit means connecting the second engine crankcase in air-flow relationship to a cleaned air point in the second engine air-intake system; means operated by the first engine, when the second engine is not operating, for effecting air-pressure drop across the aforesaid cleaned-air point in the second engine air-intake system and the first conduit means to cause cleaned air from the second engine air-intake system to enter the second engine crankcase through the second conduit means and thence to pass into the first engine crankcase via the aforesaid duct and thence to pass out of said first engine crankcase through said first conduit means; and means operated by the second engine, when the first engine is not operating, for effecting air-pressure drop across the aforesaid cleaned-air point in the first engine air-intake system and the second conduit means to cause cleaned air from said first engine air-intake system to enter the first engine crankcase through the first conduit means and thence to pass into the second engine crankcase via the aforesaid duct and out of said second engine crankcase through said second conduit means.

7. In combination: two internal combustion engines arranged for independent operation, said engines having atmospherically sealed interconnected crank chambers and independent air cleaner equipped air intake systems, and conduit means connecting the crank chamber of each engine in air flow relationship with a cleaned air point in the intake system of that engine whereat air pressure during operation of that engine independently of the other engine is higher than at the aforesaid point in the intake system of the other engine, whereby, when either engine is operated independently of the other engine, air will be drawn through the crank chamber of the operating engine to the air intake system thereof through the air cleaner-equipped intake system and crank chamber of the inoperative engine, thereby utilizing the air cleaner of the intake system of the inoperative engine for cleaning air utilized in ventilating the crank chamber of the operating engine.

8. In combination: two internal combustion engines arranged for independent operation, said engines comprising atmospherically-sealed interconnected crank chambers, each engine comprising an air intake conduit for combustion air and each such conduit being equipped with an air cleaner through which it communicates with atmosphere, and crank chamber ventilating conduit means connecting the crank chamber of each engine in air flow relationship with a point in the combustion intake conduit of that engine on the engine side of the air cleaner for such conduit, the last said conduit means for each engine being relatively very highly restricted with respect to the combustion air conduit of that engine, and the air cleaner of the intake conduit of each engine producing a much greater pressure drop thereacross under high volume air flow created during operation of that engine than results from restricted air flow through the crank case ventilating conduit means when such engine is idle and the other engine is operating, whereby, when either engine is operated independently of the other engine, air will be drawn through the crank chamber of the operating engine to the combustion air intake conduit of that engine through the air cleaner-equipped combustion air intake conduit and crank chamber of the inoperative engine, thereby utilizing the air cleaner of the combustion air intake conduit of the inoperative engine for cleaning air utilized in ventilating the crank chamber of the operating engine.

WILFRED W. LOWTHER.

REFERENCES CITED

The following references are of record in the file of this patent:

UNITED STATES PATENTS

| Number | Name | Date |
|---|---|---|
| 2,250,200 | Lowther | July 22, 1941 |
| 2,252,974 | Lowther | Aug. 19, 1941 |
| 2,382,343 | Stalker | Aug. 14, 1945 |

FOREIGN PATENTS

| Number | Country | Date |
|---|---|---|
| 547,515 | Great Britain | Aug. 31, 1942 |